United States Patent
Tsutsui (10) Patent No.: US 8,591,801 B2
(45) Date of Patent: Nov. 26, 2013

(54) PROCESS FOR PRODUCING CONDUCTOR BUILT-IN CERAMIC

(75) Inventor: Yoshiya Tsutsui, Osaka (JP)

(73) Assignee: Kyocera Corporation, Kyoto (JP)

( * ) Notice: Subject to any disclaimer, the term of this patent is extended or adjusted under 35 U.S.C. 154(b) by 552 days.

(21) Appl. No.: 12/740,332

(22) PCT Filed: Oct. 28, 2008

(86) PCT No.: PCT/JP2008/069558
§ 371 (c)(1),
(2), (4) Date: Jul. 28, 2010

(87) PCT Pub. No.: WO2009/057596
PCT Pub. Date: May 7, 2009

(65) Prior Publication Data
US 2010/0289181 A1    Nov. 18, 2010

(30) Foreign Application Priority Data

Oct. 29, 2007 (JP) .................... 2007-280606

(51) Int. Cl.
*B28B 1/24* (2006.01)
(52) U.S. Cl.
USPC ........................................... 264/645
(58) Field of Classification Search
USPC ........................................... 264/645
See application file for complete search history.

(56) References Cited

U.S. PATENT DOCUMENTS 3,581,801 A * 6/1971 Hulslander ............. 164/22
3,875,275 A * 4/1975 Lemelson .............. 264/45.3
4,162,138 A * 7/1979 Byrne ..................... 425/125

(Continued)

FOREIGN PATENT DOCUMENTS

EP    0332082 A2    3/1989
JP    59-231322    12/1984

(Continued)

OTHER PUBLICATIONS

Extended European search report dated May 4, 2012 issued in corresponding European application 08845702.3 cites the U.S. patent and foreign patent document above.

*Primary Examiner* — Joseph S Del Sole
*Assistant Examiner* — Russell Kemmerle, III
(74) *Attorney, Agent, or Firm* — DLA Piper LLP (US)

(57) ABSTRACT

[Problems] To provide a process for producing a conductor built-in ceramic which can eliminate the need to conduct metallic lead wire processing, can suppress the entry of a foreign matter, dust and the like from gaps between bases formed in dewaxing and firing and can reduce a dielectric breakdown failure, and a conductor built-in ceramic produced by the production process.

[Means for Solving Problems] A process for producing a conductor built-in ceramic, comprising the step of producing a molded product (11) for an energization part using a conduction mixture, containing an electroconductive ceramic powder and a binder, the step of holding the molded product (11) for an energization part within a mold (13) and filling a mixture (15), for a base, containing an insulating ceramic powder and a binder into the mold (13) to produce an element compact (17) comprising a molded product (11), for an energization part, covered with the mixture (15) for a base, and the step of firing the element compact (17). According to the production process, the formation of gaps between the energization part and the base can be suppressed, and external inclusion of a foreign material, dust and the like in the element compact (17) in dewaxing or firing can also be suppressed.

4 Claims, 3 Drawing Sheets

(56) References Cited

U.S. PATENT DOCUMENTS

| | | | |
|---|---|---|---|
| 4,204,307 A * | 5/1980 | Pfetzing | 29/407.09 |
| 5,044,912 A * | 9/1991 | Billings et al. | 425/116 |
| 5,085,806 A | 2/1992 | Yasutomi et al. | |
| 5,122,046 A * | 6/1992 | Lavallee et al. | 425/116 |
| 6,224,816 B1 * | 5/2001 | Hull et al. | 264/401 |
| 6,274,072 B1 * | 8/2001 | Naritomi | 264/250 |
| 6,309,589 B1 | 10/2001 | Knoll et al. | |
| 6,923,632 B2 * | 8/2005 | Koyama et al. | 425/116 |
| 2003/0062660 A1 * | 4/2003 | Beard et al. | 264/645 |
| 2005/0284859 A1 | 12/2005 | Konishi | 219/270 |
| 2006/0216479 A1 * | 9/2006 | Cowelchuk et al. | 428/174 |

FOREIGN PATENT DOCUMENTS

| | | |
|---|---|---|
| JP | 05-337629 | 12/1993 |
| JP | 10-249834 | 9/1998 |
| JP | 10-259059 | 9/1998 |
| JP | 2845256 B2 | 1/1999 |
| JP | 11-255566 | 9/1999 |
| JP | 2000-063903 | 2/2000 |
| JP | 2002-016128 | 1/2002 |
| JP | 2002-047067 | 2/2002 |
| JP | 2002-093550 | 3/2002 |
| JP | 2002532839 A | 10/2002 |
| JP | 2004-035923 | 2/2004 |
| JP | 2006-040882 | 2/2006 |

* cited by examiner

PROCESS FOR PRODUCING CONDUCTOR BUILT-IN CERAMIC

CROSS-REFERENCE TO THE RELATED APPLICATIONS

This application is a national stage of international application No. PCT/JP2008/069558, filed on Oct. 28, 2008, and claims the benefit of priority under 35 USC 119 to Japanese Patent Application No. 2007-280606, filed on Oct. 29, 2007, the entire contents of which are incorporated herein by reference.

RELATED ART

The present invention relates to a process for producing a conductor built-in ceramic.

BACKGROUND

There have been conventionally proposed various kinds of processes as a process for producing a conductor built-in ceramic. For example, each of Patent Documents 1 to 3 discloses a process for producing a ceramic having a built-in metallic member by a process that comprises granulating a mixture of a ceramic and a binder to obtain a granulated powder, hot-pressing the granulated powder into a pre-molded product, locating a metallic member between the pre-molded products and subjecting the metallic member and the pre-molded products to an uniaxial pressing to form a precursor, and sintering the precursor by hot-pressing. Each of Patent Documents 4 to 5 discloses a process to obtain a ceramic having a built-in electrode by a process that comprises applying a paste of a ceramic material for forming an electrode onto a first ceramic molded product for base, placing a second ceramic molded product for base onto the first ceramic molded product for base, and sintering them together. Further, Patent Document 6 discloses a process for producing a ceramic having a built-in energization part by sandwiching a metallic lead wire between pre-molded products and sintering them by hot-pressing.

Patent documents 1: JP10-249843A
Patent documents 2: JP10-259059A
Patent documents 3: JP11-255566A
Patent documents 4: JP2002-16128A
Patent documents 5: JP2002-93550A
Patent documents 6: JP2002-47067A
Patent documents 7: JP59-231322A

DISCLOSURE OF INVENTION

Problems to be Solved by the Invention

However, Patent Documents 1 to 3 have problems that it is difficult to produce a product having a complicated shape since each producing process thereof adopts uniaxial pressing treatment to form a precursor, and the metallic member for the process is required to have a certain level of strength or more in order to avoid the deformation of the metallic member. As to the producing process of any of Patent Documents 4 and 5, its energization part is formed by printing a paste, so that its printed paste tends to bleed or become uneven. In addition, since ceramic molded products superimposed each other are subjected to the sintering treatment, there is a problem that any of foreign substances, dust and the like is incorporated into the interface between the ceramic molded products for base. In addition, the production process of Patent Document 6 has a problem that it requires a manufacturing step of bending and/or cutting a wire rod made of such as W or W—Re alloy due to using metallic lead wire in the energization part.

In view of the above-mentioned problems, an object of the present invention is to provide a process for producing a conductor built-in ceramic which can eliminate the necessity of complicated manufacturing of a metallic lead wire, can suppress the intrusion of foreign substances or dust and the like into the interface between the ceramic molded products for base during dewaxing and sintering treatments, and can suppress the formation of any of crack, wiring disconnection and dielectric breakdown failure.

Means for Solving the Problems

The process for producing a conductor built-in ceramic of the present invention comprises: a step of forming a conduction compact using a conduction mixture which contains an electroconductive ceramic powder and a binder; a step of forming an element compact comprising the conduction compact coated with a base mixture by holding the conduction compact within a mold and then filling the mold with the base mixture which contains an insulating ceramic powder and a binder; and a step of sintering the element compact.

In addition, in the step of forming the element compact, the base mixture may be filled into the mold through the filling port that is arranged on the mold while holding the conduction compact within the mold by supporting a part of the conduction compact with a support member.

Further, in the step of forming the element compact, the base mixture may be filled into the mold through the filling port with holding the conduction compact within the mold by supporting the conduction compact by a plurality of support members while isolating the support members from the conduction compact in the order from near to far from the filling port among the support members.

Further, the mold may comprises at least two mold parts arranged on one side and the other side to be opposed each other in the step of forming the element compact and the step of forming the element compact may comprises: placing the conduction compact on an inner surface of a first mold part of the mold parts that is arranged on the one side; placing a second mold part of the mold parts on the other side to form a cavity between an inner surface of the second mold and a surface on the other side of the conduction compact; and then filling the base mixture into the cavity; after filling, replacing the first mold part with a third mold part to form a cavity between an inner surface of the third mold part and one side surface of the conduction compact; filling the base mixture into the cavity, thereby producing the element compact comprising the conduction compact coated by the base mixture.

Another producing process of a conductor built-in ceramic of the present invention comprises: a step of forming a conduction compact using a conduction mixture which contains an electroconductive ceramic powder and a binder; a step of forming a plurality of base compacts using a base mixture which contains an insulating ceramic powder and a binder; a step of arranging the conduction compact between the base compacts and coating the conduction compact with the base compacts, while adhering to between the base compacts to produce the element compact; and a step of sintering the element compact.

In the above construction, it is preferable that there is a relationship Tg(B)<Tg(A), wherein Tg(A) is the glass transition temperature of the binder contained in the conduction mixture and Tg(B) is the glass transition temperature of the binder contained in the base mixture.

In the above construction, it is preferable that there is a relationship Tv(B)<Tv(A), wherein Tv(A) is the temperature at which the viscosity of the conduction mixture becomes 100 MPa·s and Tv(B) is the temperature at which the viscosity of the base mixture becomes 100 MPa·s.

In the above construction, it is preferable that before the above sintering treatment, the element compact is immersed in a solvent in which the binder is soluble, thereby the binder soluble in the solvent is extracted, which binder is contained in the element compact.

Effect of the Invention

According to the present invention, the element compact comprising the conduction compact coated by the base mixture by holding the conduction compact within the mold, and filling the mold with a base mixture which contains an insulating ceramic powder and a binder. Thus, it possible to suppress the formation of gaps between the conduction compact and the base and also suppress foreign substances or dust and the like from incorporating into the element compact during the dewaxing treatment or the sintering treatment. As a result, it becomes capable to suppress the deformation of the molded product after the sintering treatment, and additionally suppress the formation of crack, wiring disconnection and dielectric breakdown.

BEST MODE OF THE INVENTION

Hereinafter, the process for producing the conductor built-in ceramic in one embodiment of the present invention is explained with reference to the accompanied drawings.

First Embodiment

Figure 1:
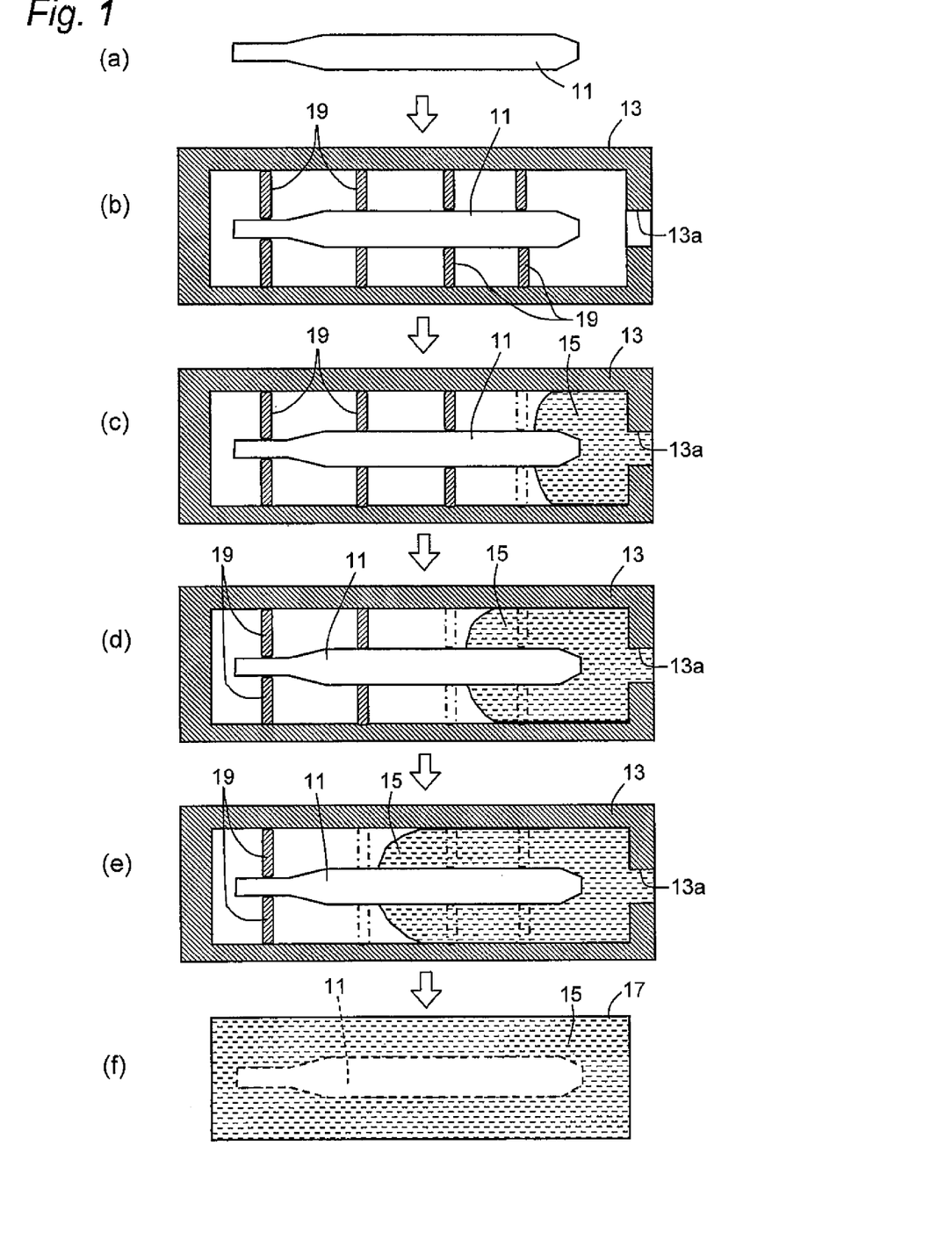
FIGS. 1(a) to 1(f) each show a schematic transverse sectional view at each step of the producing process of Embodiment 1 in the present invention.

Each of FIGS. 1(a) to 1(f) shows a transverse sectional view at each step of the process for producing the conductor built-in ceramic in the present embodiment. The producing process of the present embodiment comprises the steps of:

forming a conduction compact (11) through an injection molding using a conduction mixture (a compound) which contains an electroconductive ceramic powder and a binder (FIG. 1(a));

holding the conduction compact (11) within a mold (13) (FIG. 1(b)), followed by filling the mold (13) with a base mixture (15) which contains an insulating ceramic powder and a binder (a slurry or a compound) (FIGS. 1(c) to 1(e)), thereby forming an element compact (17) comprising the conduction compact (11) coated by the base mixture (15) (FIG. 1(f)); and sintering the element compact (17).

Specifically, as shown in FIGS. 1(c) to 1(e), during the step for forming the element compact (17), the base mixture (15) is filled into the mold (13) through the filling port (13a) that is arranged on the mold (13), while holding the conduction compact (11) within the mold (13) by supporting a part of the conduction compact (11) with a support member (19).

Here, the term "compound" means a material wherein a ceramic powder is dispersed in a binder comprising a resin, which does not contain a solvent ingredient and has a solid-like form at a room temperature. The term "slurry" means a material which is made by mixing a solvent, a dispersing agent, a binder and a ceramic powder, and which has a liquid-like form at a room temperature.

In the present embodiment, the conduction compact (11) is held within the mold (13) by a plurality of pins (support members) (19). Keeping this condition, the base mixture (15) is filled into the mold (13) through the filling port (13a), while the pins (19) are isolated from the conduction compact (11) in the order from near to far from the filling port (13a) among the pins (19). This operation makes it possible to suppress the formation of gaps between the conduction compact (11) and the base mixture (15) and also suppress foreign substances or dust and the like from incorporating into the element compact (17) during the dewaxing treatment or the sintering treatment. As a result, it is capable to suppress the deformation of the molded product after the sintering treatment, and additionally suppress the formation of crack or wiring disconnection. In order to isolate the pins (19) from the conduction compact (11), for example, a space for accommodating the pins (19) is formed in the mold (13) and the pins (19) may be sequentially accommodated within the space. According to the producing process in this embodiment, the element compact (17) can be freely fabricated even if the element compact (17) has a complicated shape.

As a ceramic material which constitutes the conduction compact (11), for example, tungsten carbide (WC) and so forth may be used, although not particularly limited thereto. The resistance of the conductor (energization part) can be optimized by using the above-mentioned tungsten carbide as the main ingredient, to which any of silicon nitride ($Si_3N_4$), boron nitride (BN), tungsten (W), tantalum (Ta), molybdenum (Mo), rhenium (Re) and so forth may be added depending on the necessity.

As the ceramic material which forms the element compact (17), for example, silicon nitride ($Si_3N_4$) or aluminum nitride (AlN) and so forth can be used, although not particularly limited thereto. The electrical insulation property and the strength of the conductor built-in ceramic can be improved by using the above-mentioned ceramic material as the main ingredient, to which any of $Y_2O_3$, $Yb_2O_3$, $Er_2O_3$, $Al_3O_3$, BN, $SiO_2$ and so forth may be added depending on the necessity.

As the binder in the present embodiment, for example, thermoplastics may be mentioned. As a specific example of the thermoplastics, for example, polypropylene, polyethylene, polystyrene, styrene-acetic acid copolymer, nylon, paraffin wax, polybutyl methacrylate, polymethyl methacrylate (PMMA) and so forth are mentioned. One or two or more compound may be selected from the above.

When the binder contained in the conduction mixture has a glass transition temperature of Tg(A) (hereinafter, the temperature is expressed by degrees Celsius (° C.)) and the binder contained in the base mixture has the glass transition temperature Tg(B) (hereinafter the temperature unit is ° C.), it is preferable that they satisfy the relationship Tg(B)<Tg(A). When the above relationship is satisfied, the deformation or dissolution of the conduction compact (11) can be suppressed during the treatment to coat the conduction compact (11) with the base mixture (15) in the step of forming the element compact (17). Thereby, it is capable to obtain an element compact (17) having a shape which is closer to the desired shape thereof, so that a conductor built-in ceramic provided with the desired heat generation property can be obtained.

In addition, it is preferable that there is a relationship Tv(B)<Tv(A), wherein Tv(A) is the temperature at which the viscosity of the conduction mixture becomes 100 Mpa·s and Tv(B) is the temperature at which the viscosity of the base mixture becomes 100 MPa·s. When the above relationship is satisfied, the deformation or dissolution of the conduction compact (11) can be suppressed in the way similar to the above, during the treatment to coat the conduction compact (11) with the base mixture (15) in the step of forming the element compact (17). Thereby, it is capable to obtain an element compact (17) having a shape which is closer to the desired shape thereof.

In addition, it is preferable that the producing process of the present embodiment is further provided with the dewaxing step prior to the sintering treatment. Specifically, a release agent is applied to the element compact (17) which was produced from the above process, and then the element compact is subjected to a dewaxing by heating treatment under a nitrogen atmosphere at a temperature of 400° C. for 8 hours. Thereafter, the element compact is subjected to a sintering treatment in a non-oxidative atmosphere, thereby a sintered body (the conductor built-in ceramic of the present invention) can be obtained. The obtained sintered body may be further subjected to a peripheral processing for the desired shape depending on the necessity.

In addition, a method that the binder contained in the element compact (17), which is soluble in a solvent, is extracted by immersing the element compact (17) in a solvent in which the binder is soluble may be adopted in the dewaxing treatment. In such a dewaxing treatment, the dewaxing is performed by immersing the element compact (17) in the solvent at first and then the binder, which is soluble in the solvent, is extracted. Subsequently, a release agent is applied to the element compact (17) after dewaxed and the element compact is sintered in a non-oxidative atmosphere, thereby a sintered body can be obtained.

As the solvent to be used in the dewaxing treatment, wherein the element compact is immersed therein, includes, any of optionally selected from, for example, ketones such as acetone, methylethyl ketone and methylisobutyl ketone, hydrocarbons based solvents such as cyclohexane, hexane, cycloheptane, heptane, octane, nonane and decane, aromatic hydrocarbons such as benzene, toluene and xylene, and terpene based hydrocarbons such as alpha-pinene, limonene and terpineol, and aromatic hydrocarbons such as toluene and xylene. As the binder to be used in the dewaxing treatment, any one which is soluble in the above solvent can be selected.

Second Embodiment

Figure 2:
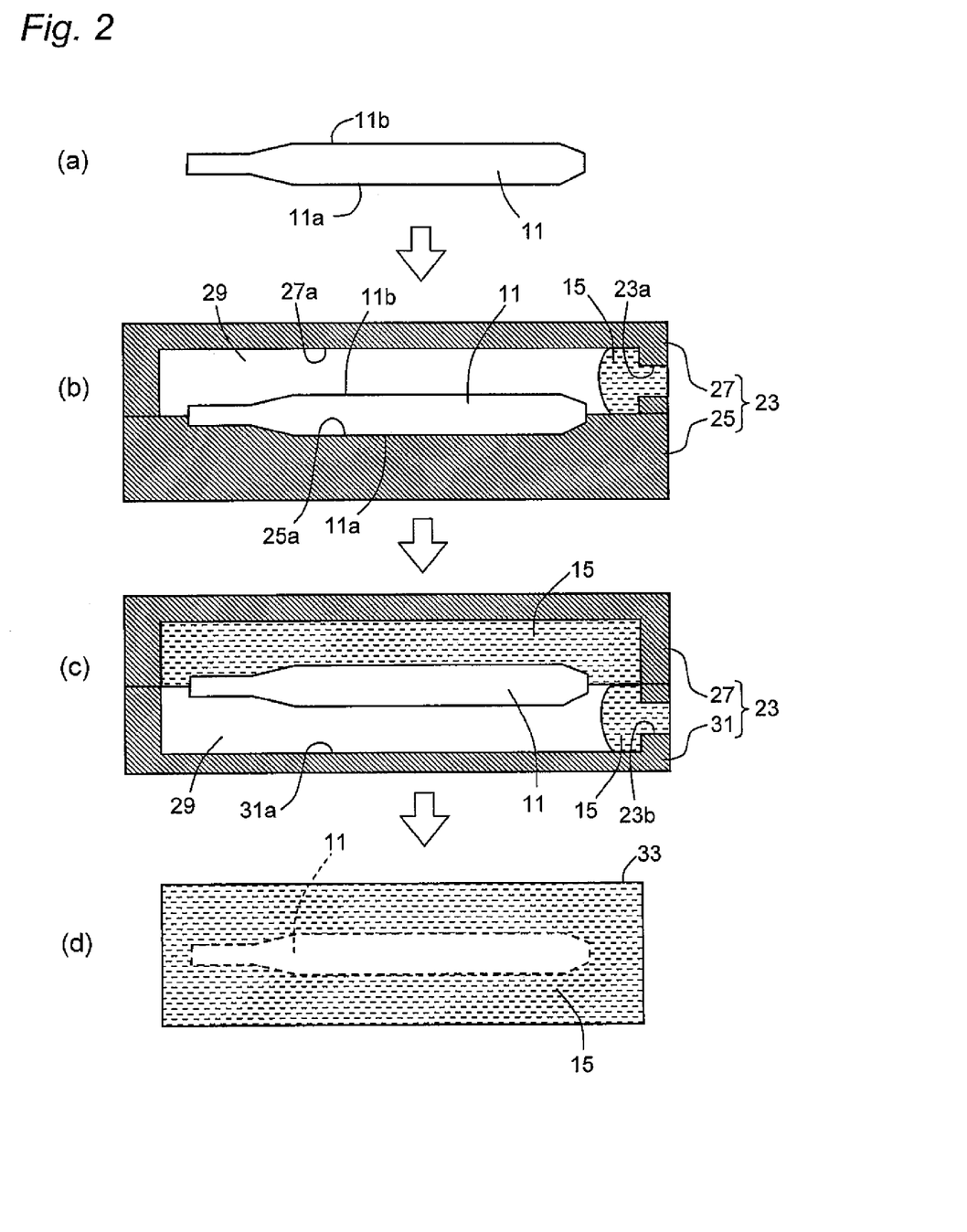
FIGS. 2(a) to 2(d) each show a schematic transverse sectional view at each step of the producing process of Embodiment 2 in the present invention.

Next, the producing process of a second embodiment of the present invention is explained. According to this producing process, in the step of forming the element compact, a part of the conduction compact (11) is coated by the base mixture (15) and then the rest part of the conduction compact (11) is coated by the base mixture (15) during the coating treatment of the conduction compact (11) by the base mixture (15), as shown in FIG. 2. Thereby, the element compact (33) can be produced. A specific example is shown below.

Each of FIGS. 2(a) to 2(d) shows a transverse sectional view at each step of the second embodiment of the present invention. As shown in FIGS. 2(a) to 2(d), the producing process of this embodiment comprises different steps of producing the element compact (33) from those of the first embodiment.

In the step of forming the element compact in this embodiment, a mold for injection molding (23) comprising a plurality of mold parts (25), (27) and (31) is used, wherein one mold part is arranged on one side and the other mold part is arranged on the other side, thereby one mold part is arranged opposite to the other mold part. First, the conduction compact (11) is placed on an inner surface (25a) of a first mold part (25), that is arranged on one side among the mold parts (25), (27) and (31), so that one side face (11a) of the molded product (11) contacts with the inner surface (25a). At this time, a cavity (29) is formed between an inner surface (27a) of a second mold part (27) arranged on the other side and the other side face (11b) of the conduction compact (11). In this state, the injection molding is performed by filling the base mixture (15) into the cavity (29) via the filling port (23a) (FIG. 2(b)).

Then, the first mold part (25) is replaced with a third mold part (31). A cavity (29) is formed between the inner surface (31a) of the third mold part (31) and one side surface (11a) of the molded product (11). In this state, the injection molding is performed by filling the base mixture (15) into the cavity (29) via the filling port (23b) (FIG. 2(c)). Thereby, the element compact (33), in which the conduction compact (11) is coated with the base mixture (15), is obtained.

According to the producing process as mentioned above, the element compact (33) can be produced more stably compared with the first embodiment, even if the element compact (33) has a construction prone to break due to having a small or a thin form. According to this process, it is capable to suppress the formation of gaps between the conduction compact (11) and the base mixture (15) and also suppress foreign substances or dust and the like from incorporating into the element compact (33) during the dewaxing treatment or the sintering treatment as with the case of the first embodiment. Thereby, it becomes capable to suppress the deformation of the molded product after the sintering treatment, and additionally suppress the formation of crack or wiring disconnection.

Third Embodiment

Figure 3:
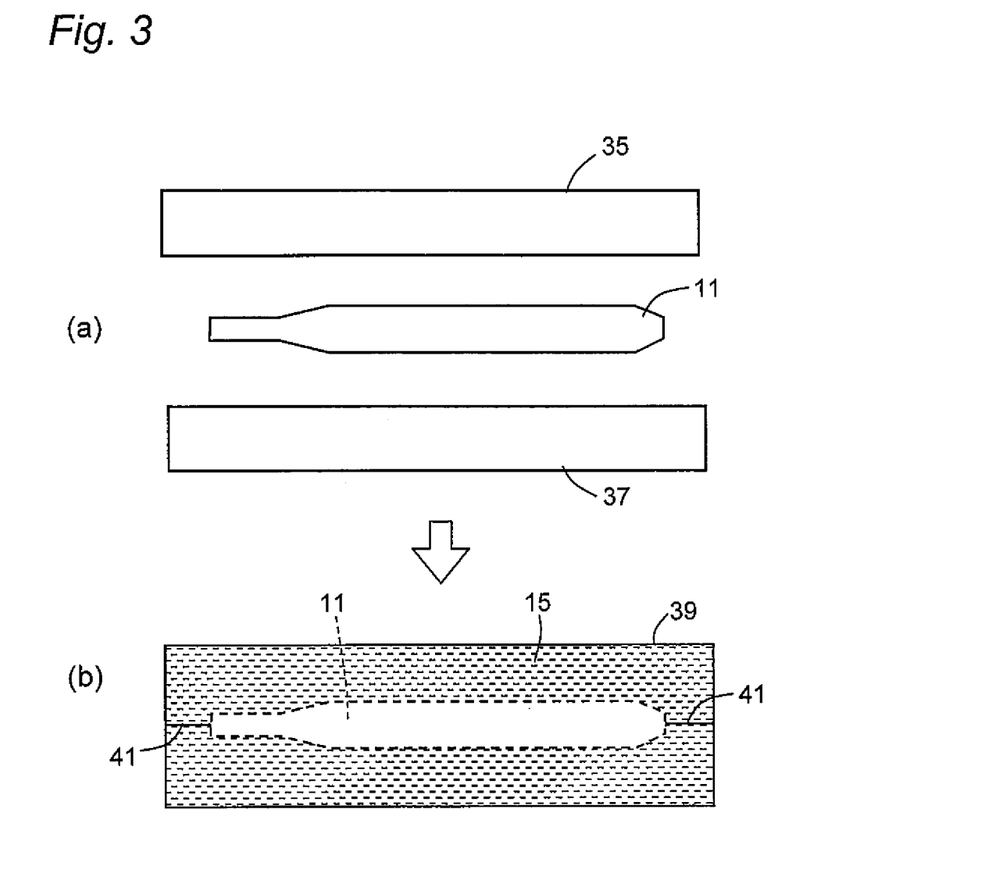
FIGS. 3(a) and 3(b) each show a schematic transverse sectional view at each step of the producing process of Embodiment 3 in the present invention.

Each of FIGS. 3(a) and 3(b) shows a transverse sectional view at each step of the third embodiment of the present invention. As shown in FIGS. 3(a) and 3(b), the producing process of this embodiment comprises the steps of:

forming a conduction compact (11) through an injection molding using a conduction mixture (a compound) which contains an electroconductive ceramic powder and a binder (FIG. 3(a)); forming two molded products for base (35, 37) through an injection molding using a base mixture (a compound) which contains an insulating ceramic powder and a binder (FIG. 3(a)); placing the conduction compact (11) between two molded products for base (35, 37) and adhering two molded products for base (35, 37) each other, thereby obtaining the element compact (39) comprising the conduction compact (11) coated with both molded products for base (35, 37) (FIG. 3(a)), and sintering the element compact (39).

Thus, according to the producing process of this embodiment, it is capable to suppress the formation of gaps in the interfaces among each of the bases during dewaxing treatment or sintering treatment by adhering the interface between both molded products for base (35, 37). Thereby, intrusion of foreign substances or dust and the like from the interface between each of the bases can be suppressed during dewaxing treatment or sintering treatment. Thus, it becomes capable to stably obtain the product, while suppressing the formation of any of crack, wiring disconnection and dielectric breakdown.

AS a method of adhering the interface between both molded products for base (35, 37) in the present embodiment, for example, a method of using an adhesive may be mentioned. As such an adhesive, there may be mentioned, for example, an acrylic-based adhesive, an epoxy-based adhesive, a polyurethane-based adhesive and a polyolefin-based adhesive. An adhesive of one component type, two component types or three component types may be used as these adhesive. As the method of adhering between both molded products for base (35, 37), for example, a method of using an ultrasonic welder, a high frequency welder and a laser welder may be used. When these methods are performed, particularly applying heat at a high temperature, in order to suppress a phenomenon that the conduction compact (11) softens earlier than the molded products for base (35, 37), it is preferable that the binders contained in each mixtures satisfy the relation $Tg(B)<Tg(A)$. When the above relationship is satisfied, the deformation or dissolution of the conduction compact (11)

can be suppressed. Thus, an element compact (39) having a shape which is closer to the desired shape thereof can be obtained, thereby a conductor built-in ceramic having the desired heat generation property can be obtained.

The ceramics having a built-in conductor of the present invention are applicable to various ceramic products including ceramic heaters, for example, a heater for semiconductor production system.

EXAMPLES

Example 1

A conduction compact was produced by injection molding using the compound (Tg=140° C., Tv=190° C.) which contains WC powder, $Si_3N_4$ powder and polypropylene in the ratio shown in Table 1. Keeping the condition where the above conduction compact is held within a mold, a slurry containing an acrylic resin (Tg=50° C.), ethyl alcohol, and $Si_3N_4$ powder in the ratio shown in Table 1 was injected into the mold so as to coat the conduction compact through the injection molding. Thus, an element compact was produced. Subsequently, this element compact was subjected to a dewaxing by heating treatment and then a sintering treatment. Thus, a sintered body (a conductor built-in ceramic) was obtained. The resistance and the bending strength of the conductor built-in ceramic obtained as above were evaluated according to the following methods. The condition for dewaxing by heating treatment was 250° C. for 1 hour and the condition for sintering treatment was 1800° C. for 3 hours.

Example 2

A sintered body was obtained in the same way as Example except that a compound (Tg=90° C., Tv=150° C.) which contains WC powder, $Si_3N_4$ powder, and polyethylene in the ratio shown in Table 1 was used as the material for the conduction compact, and the slurry Which contains an acrylic resin (Tg=50° C.), isopropyl alcohol and $Si_3N_4$ powder in the ratio shown in Table 1 was used as the material that coats the conduction compact. The resistance and the bending strength of the sintered body obtained as above were evaluated in the same way as Example 1.

Example 3

A sintered body was obtained in the same way as Example except that a compound (Tg=70° C., Tv=120° C.) which contains WC powder, BN powder, and paraffin wax in the ratio shown in Table 1 was used as the material for the conduction compact, and a compound (Tg=40° C., Tv=70° C.) which contains isoparaffin wax and $Si_3N_4$ powder in the ratio shown in Table 1 were used as the material that coats the conduction compact. The resistance and the bending strength of the sintered body obtained as above were evaluated in the same way as Example 1.

Example 4

A sintered body was obtained in the same way as Example 1 except that a compound (Tv=180° C.) which contains WC powder, $Si_3N_4$ powder, polystyrene (Tg=90° C.) and paraffin wax (Tg=70° C.) in the ratio shown in Table 1 was used as the material for the conduction compact, and a compound (Tv=150° C.) which contains polystyrene (Tg=90° C.), isoparaffin wax (Tg=40° C.) and $Si_3N_4$ powder in the ratio shown in Table 1 was used as the material that coats the conduction compact. Subsequently, this element compact was subjected to a dewaxing by solvent treatment using alpha-pinene and then to a sintering treatment. Thus, a sintered body (a conductor built-in ceramic) was obtained. The resistance and the bending strength of the sintered body obtained as above were evaluated in the same way as Example 1.

Example 5

A conduction compact was produced by injection molding using the compound (Tg=70° C., Tv=120° C.) which contains WC powder, $Si_3N_4$ powder and isoparaffin wax in the ratio shown in Table 1. In addition, a plurality of molded products for base were produced by injection molding using the compound (Tg=40° C., Tv=70° C.) which contains paraffin wax and $Si_3N_4$ powder in the ratio shown in Table 1. Then, the conduction compact was sandwiched between the molded products for base and then the interface between the molded products for base was laser welded. Thus, an element compact was obtained. This element compact was subjected to a dewaxing by heating treatment and sintering treatment. Thus, a sintered body (a conductor built-in ceramic) was obtained. The resistance and the bending strength of the conductor built-in ceramic obtained as above were evaluated in the same way as Example 1.

Comparative Example 1

A conduction compact was produced by injection molding using the compound (Tg=60° C., Tv=110° C.) which contains WC powder, $Si_3N_4$ powder and paraffin wax in the ratio shown in Table 2. Keeping the condition where the above conduction compact being held within a mold, a compound (Tg=70° C., Tv 120° C.) which contains paraffin wax and WC powder in the ratio shown in Table 2 was injected into the mold so as to coat the conduction compact by injection molding. Thus, an element compact was produced. Subsequently, this element compact was subjected to a dewaxing by heating treatment and then a sintering treatment. Thus, a sintered body (a conductor built-in ceramic) was obtained. The resistance and the bending strength of the conductor built-in ceramic obtained as above were evaluated as with Example 1. The condition for dewaxing by heating treatment was 250° C. for 1 hour and the condition for sintering treatment was 1800° C. for 3 hours.

Comparative Example 2

A conduction compact was produced by injection molding using the compound (Tg=70° C., Tv=120° C.) which contains WC powder, $Si_3N_4$ powder and isoparaffin wax in the ratio shown in Table 2. In addition, a plurality of molded products for base were produced by injection molding using the compound (Tg=40° C., Tv=70° C.) which contains paraffin wax and $Si_3N_4$ powder in the ratio shown in Table 2. Then, the conduction compact was sandwiched between the molded products for base to obtain the element compact. This element compact was subjected to the dewaxing by heating treatment and the sintering treatment. Thus, the sintered body (a conductor built-in ceramic) was obtained. The resistance and the bending strength of the conductor built-in ceramic obtained as above were evaluated in the same way as Example 1. The condition for dewaxing by heating treatment was 250° C. for 1 hour and the condition for sintering treatment was 1800° C. for 3 hours.

TABLE 1

|  |  | Example 1 | Example 2 | Example 3 | Example 4 | Example 5 |
|---|---|---|---|---|---|---|
| conduction compact | ceramic powder | 80 vol % | 80 vol % | 60 vol % | 40 vol % | 40 vol % |
|  | polypropylene | 20 vol % | — | — | — | — |
|  | polyethylene | — | 20 vol % | — | — | — |
|  | polystyrene | — | — | — | 20 vol % | — |
|  | paraffin wax | — | — | 40 vol % | 30 vol % | — |
|  | isoparaffin wax | — | — | — | — | 60 vol % |
| molded product for base | ceramic powder | 39 vol % | 39 vol % | 60 vol % | 40 vol % | 40 vol % |
|  | acrylic resin | 10 vol % | 10 vol % | — | — | — |
|  | polystyrene | — | — | — | 25 vol % | — |
|  | paraffin wax | — | — | — | — | 60 vol % |
|  | isoparaffin wax | — | — | 40 vol % | 35 vol % | — |
|  | solvent | 50 vol % | 50 vol % | — | — | — |
|  | dispersing agent | 1 vol % | 1 vol % | — | — | — |

TABLE 2

|  |  | Comparative Example 1 | Comparative Example 2 |
|---|---|---|---|
| conduction compact | ceramic powder | 40 vol % | 40 vol % |
|  | paraffin wax | 60 vol % | — |
|  | isoparaffin wax | — | 60 vol % |
| molded product for base | ceramic powder | 40 vol % | 40 vol % |
|  | paraffin wax | 60 vol % | 60 vol % |

The resistance of the energization part of the ceramic heater was measured by the resistance between the cathode terminal and the anode terminal thereof using a tester. As to the bending strength, cantilever bending strength was measured using a Strograph, manufactured by Toyo Seiki Seisaku-sho, Ltd. The results are shown in Table 3.

TABLE 3

|  | Resistance (m Ohm) | Bending Strength (MPa) |
|---|---|---|
| Example 1 | 330 | 950 |
| Example 2 | 340 | 970 |
| Example 3 | 325 | 1010 |
| Example 4 | 320 | 980 |
| Example 5 | 345 | 1030 |
| Comparative Example 1 | 10 | 1000 |
| Comparative Example 2 | 50 | 980 |

As shown in Table 3, each electroconductive ceramic of Examples 1 to 5 showed a resistance value as it was designed and showed to have a satisfactory bending strength, so that it is confirmed that each of them performs the function as a conductor built-in ceramic.

In Comparative Example 1, the molded product for base was made comprising WC powder, so that the sintering treatment was not only sufficiently carried out, but also the element as a whole had become the energization part after it was sintered. Thus, the product did not perform the function as a conductor built-in ceramic.

In Comparative Example 2, the element compact was subjected to the dewaxing treatment and the sintering treatment after applying a release agent thereto without adhering the interface between the molded products for base. Thus, components of the release agent had intruded into the element compact, so that they remained in and around the energization parts as a foreign substance. Thus, the energization parts had caused short-circuits therein, so that the product failed to perform the function as a conductor built-in ceramic.

EXPLANATION OF REFERENCE NUMERALS 11 conduction compact
13 mold
13a filling port
15 base mixture
17 element compact
19 pins (support members)
23 mold
23a, 23b filling port
25 first mold part
27 second mold part
29 cavity
31 third mold part
33 element compact
35, 37 molded product for base
39 element compact
41 adhered surface

The invention claimed is:
1. A process for manufacturing a conductor built-in ceramic, comprising:
   forming a conduction compact by using a conduction mixture which contains an electroconductive ceramic powder and a first binder;
   wherein forming an element compact comprises
   holding the conduction compact within a mold by pins for supporting a part of the conduction compact;

filling the mold with a base mixture containing an insulating ceramic powder and a second binder through a filling port that is arranged at the mold to form an element compact comprising the conduction compact coated with the base mixture; and sintering the element compact, wherein Tg(A) represents the glass transition temperature of the first binder contained in the conduction mixture and Tg(B) represents the glass transition temperature of the second binder contained in the base mixture, and wherein a relationship Tg(B)<Tg(A) is satisfied;

wherein Tv(A) represents the temperature at which the viscosity of the conduction mixture becomes 100 MPa·s and Tv(B) represents the temperature at which the viscosity of the base mixture becomes 100 MPa·s, and wherein a relationship Tv(B)<Tv(A) is satisfied.

2. The process for manufacturing a conductor built-in ceramic according to claim 1, wherein forming the element compact comprises:

holding the conduction compact within the mold by a plurality of the pins; and filling the mold with the base mixture through a filling port while moving pins away from the conduction compact in the order from the nearest pin to the filling port to the farthest pin thereto.

3. The process for manufacturing a conductor built-in ceramic according to claim 1, wherein the mold comprises at least two mold parts arranged on one side and the other side to be opposed each other, forming the element compact further comprises:

placing the conduction compact on an inner surface of a first mold part of the mold parts that is arranged on the one side;

placing a second mold part of the mold parts on the other side to form a first cavity between an inner surface of the second mold and a surface on the other side of the conduction compact;

filling the base mixture into the first cavity;

replacing the first mold part with a third mold part after filling, to form a second cavity between an inner surface of the third mold part and one side surface of the conduction compact; and filling the base mixture into the second cavity to form the element compact which comprises the conduction compact coated with the base mixture.

4. The process for manufacturing a conductor built-in ceramic according to claim 1 further comprising:

before the above sintering step, immersing the element compact in a solvent where the binder is soluble to extract the binder which is soluble in the solvent and is contained in the element compact.

* * * * *